3,796,784
PROCESS FOR MOULDING STRUCTURES OF PLASTICS MATERIAL
Rene Henri Cournut, Bordeaux-Cauderan, France, assignor to Societe Bordelaise de Matieres Plastiques, Bordeaux-Cauderan, France
Filed Dec. 15, 1971, Ser. No. 208,388
Claims priority, application France, Dec. 15, 1970, 7045209
Int. Cl. B29c 11/00; B29d 9/00
U.S. Cl. 264—255                                           11 Claims

ABSTRACT OF THE DISCLOSURE

Process for moulding a structure from thermoplastic material in a cavity defined by a male half-mould and a female half-mould. An amount of at least one plastics material in particulate form is placed in the female half-mould and the latter is heated to render the material pasty or semi-liquid. The male half-mould, which is at room temperature, is applied for a short period and at low pressure on the plastics material so as to cause the mould cavity to be completely filled thereby. Owing to the relatively cold surface of the male half-mould, the latter forms a shell on the part of the plastics material which comes in contact with the male half-mould. This shell performs the function of the male half-mould and enables the latter to be withdrawn before finally cooling the plastics material in the female half-mould.

---

Figure 1:
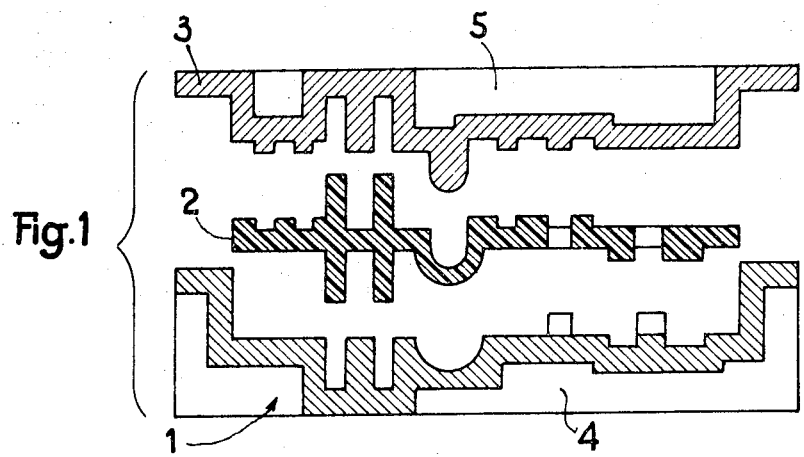

A process is described for a moulding plant which has a series of female half-moulds which receive in turn a single male half-mould.

The present invention relates to the moulding of parts or structures of plastics material and more particularly to a moulding process for plastics structures which may have very complex shapes and large surface areas.

Among the most commonly used moulding processes there may be mentioned the injection moulding of a plastics material under pressure in the cavity of a mould consisting of two half-moulds in which there are previously formed impressions having the profiles of opposite sides of the structure to be obtained.

This moulding process gives excellent results but has a number of drawbacks.

It requires the use of presses of high power proportional to the surface area of the structure to be obtained so that it is hardly suitable when structures having large surfaces are to be formed.

The magnitude of the forces of compression employed requires moulds composed of very strong materials and having very thick walls.

The setting of the moulded structure, by cooling in respect of thermoplastic materials or polymerization in respect of thermosetting materials, occurs in the closed mould. Consequently, as many complete moulds as there are structures to be formed simultaneously must be available.

The process of moulding by injection and under high pressure only allows using plastics materials having short reinforcing fibre filler, since before its injection into the mould the plastics material undergoes an intensive stirring in a screw device under high pressure and the fibres are crushed therein.

The structures obtained by conventional pressure moulding processes have high internal tensions due to irregularities in the pressure prevailing in the various parts of the cavity of the mould caused by the displacements of the material during the filling of the cavity.

An object of the invention is to remedy the aforementioned drawbacks and provide a process for moulding structures from plastics material which, while employing very low energy, produces structures which have any shape and a surface as large as desired and may include a plurality of materials.

The invention provides a process for moulding structures from thermoplastic material in a mould comprising a male half-mould and a female half-mould the confronting faces of the two half-moulds defining a cavity having the shape of the structure to be obtained, said process comprising disposing in the female half-mould an amount of at least one plastics material in the particulate state necessary for forming the structure, heating the female half-mould so as to soften the plastics material until it reaches the pasty or semi-fluid state, applying on the bath of plastics material thus obtained, during a short period and under low pressure, the male half-mould which had been maintained up till then at room temperature so as to fill the impression of the structure formed by the two half-moulds and form a shell having the shape of the impression of the male half-mould by the local solidification of the material which comes in contact with the inner cold surface of the male half-mould, withdrawing the male half-mould and cooling the structure thus obtained in the female half-mould, said shell performing the function of a male half-mould during said last cooling stage.

Figure 2:
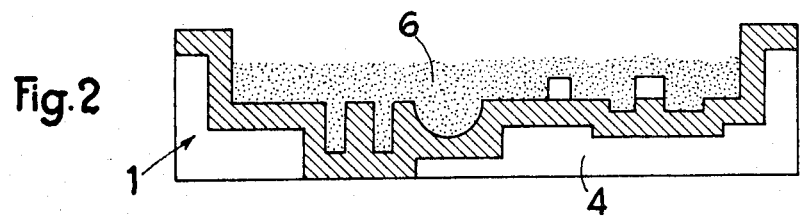
Figure 3:
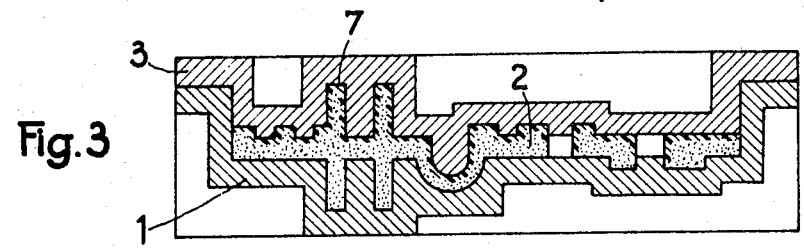
Figure 4:
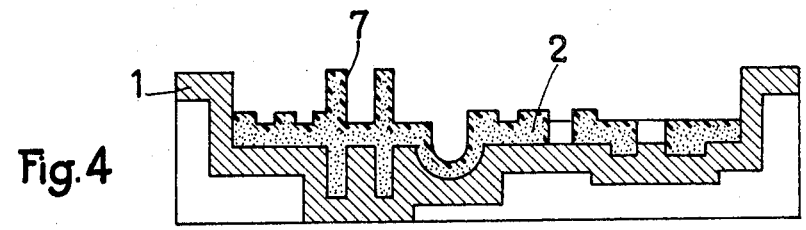

Further features and advantages of the invention will be apparent from the ensuing description with reference to the accompanying drawings given merely by way of example and in which:

FIG. 1 is a sectional view of the mould employed for carrying out the process according to the invention and the structure obtained by means of this process, the two half-moulds being shown separated, and FIGS. 2, 3 and 4 are views of respectively three stages of the process according to the invention.

The mould shown in FIG. 1 is intended for forming a part or structure 1 of thermoplastic material for example polypropylene, acrylobutylstyrene or the like.

The mould comprises a female half-mould 1 of thin metal, for example pressed or stamped sheet aluminium whose inner profile reproduces the profile of the lower surface of a part or structure 2 to be formed.

In the embodiment shown in FIG. 1, the shape of the structure 2 has been purposely chosen complex so as to illustrate the possibilities of the process according to the invention.

A male half-mould 3 is also made from thin sheet metal. Ribs 4 and 5 adapted to constitute bearing surfaces are attached to the half-moulds or produced in the course of the shaping of these half-moulds.

In the course of the stage of the process according to the invention shown in FIG. 2, an amount of thermoplastic material 6 required for forming the structure 2 shown in FIG. 1 is placed in the female half-mould 1.

This plastics material may be in the form of particles, for example in the powdered, granular or other state and may contain, for example, a filler comprising long fibres to increase the strength of the finished product.

The female half-mould 1 containing the plastics material 6 is then for example placed in a conventional gelling tunnel (not shown) and heated until the plastics material 6 reaches a pasty or semifluid state.

Meanwhile, the half-mould 3 is maintained at surrounding or room temperature.

In the course of the stage shown in FIG. 3, the half-mould 3 which is cold with respect to the female half-mould 1 containing the softened plastics material 6 is fitted into the female half-mould for a short instant and at low pressure, for example by means of a low-capacity press (not shown), so that the softened plastics material 6 penetrates the hollows of the profile of the male half-mould 3.

The plastics material upon contact with the inner surface of the half-mould 3, which is at a temperature distinctly lower than that of the female half-mould 1, is locally solidified and constitutes a shell or skin 7 whose strength is sufficient to define the profile of the upper surface of the structure 2. The male half-mould 3 is then removed. The female half-mould 1 contains a structure or part whose contours are defined, on one hand, by the impression of the female half-mould 1 and, on the other hand, by the shell 7 formed by the plastics material which was in contact with the male half-mould 3 (FIG. 4).

The female half-mould 1 is then cooled with the structure 2 until the centre part 8 of the structure has set.

The structure 2 is then removed from the female half-mould 1.

The conditions to comply with in order to produce a part or structure in the process according to the invention are given in the two following examples:

EXAMPLE 1

Polypropylene structure:
  Melting temperature _____° C__ 180 to 220
  Temperature of the male half-mould
                                  ° C__   10 to 40
  Temperature of formation of the skin
                                  ° C__       100
  Period of application of the male half-
    mould on the female half-mould ____about 10 sec.
  Pressure _____kg./cm.² ____ 8

EXAMPLE 2

Acrylobutylstyrene structure:
  Melting temperature _____° C__      250
  Temperature of the male half-mould
                                  ° C__   10 to 40
  Temperature of formation of the skin
                                  ° C__       100
  Period of application of the male half-
    mould on the female half-mould _____about 10 sec.
  Pressure _____kg./cm.² ____ 8

According to the process just described, an amount of a single thermoplastic material, possibly having a filler of reinforcing fibres, is placed in a female half-mould before heating the mould.

The fibres may be fibres of glass, asbestos or like material mixed with the plastics material in the form of particles before introduction in the half-mould 1 or in the latter.

It is therefore possible to employ fibres having sufficient length to impart to the formed parts or structures a strength which would be impossible to obtain by means of an injection moulding process.

The process according to the invention also permits placing in the female half-mould a plurality of superposed layers of different thermoplastic materials, provided these materials have rather close melting points, are weldable together and have compatible shrinkage properties.

The subsequent treatment by the process according to the invention results in structures or parts formed by the superposition of layers of different materials.

This is particularly advantageous when it is desired to obtain a structure of which at least one face must be of a color different from that of the basic material of the structure.

Indeed, a structure is obtained whose outer appearance is identical to that of a structure colored throughout its thickness and whose manufacture is much more expensive.

Further, if it is desired to modify locally the mechanical properties of a structure, one of the layers which corresponds to a zone which must have, for example, higher bending strength, has a reinforcing fibre filler.

The process according to the invention also enables reinforcements or other devices to be inserted in the structure before moulding.

Another advantage of the process according to the invention resides in the fact that the removal of the male half-mould after a short period of application on the female half-mould enables the male half-mould to be once again employed on other identical female half-moulds which contain the molten plastics material. Thus, a moulding plant employing the process according to the invention may comprise a very small number of male half-moulds for a very large number of female half-moulds.

The final structure-cooling stage in the female half-mould is carried out outside the moulding plant whereas structures manufactured by conventional injection moulding processes are cooled within the closed mould in the moulding machine.

The moulds employed are very light and cheap and have a low thermal inertia so that the solidification of the structure can be accelerated.

Moreover, bearing in mind the low pressure employed for applying the male half-mould on the female half-mould, the process according to the invention permits the production of structures or parts having surfaces which are much larger than with conventional moulding processes and therefore opens up interesting possibilities in the manufacture of products such as handling pallets or the like, the manufacture of which by pressure moulding processes could not have been envisaged heretofore.

Further, owing to the low pressures employed in their manufacture, the structures obtained by means of the process according to the invention have very low internal tensions so that risk of distorsion or warping in the course of ageing of these structures is reduced to a minimum.

Having now described my invention what I claim and desire to secure by Letters Patent is:

1. A process for moulding structures from thermoplastic material in a mould comprising a male half-mould and a female half-mould, confronting faces of the two half-moulds defining a cavity having the shape of the structure to be moulded, said process comprising the steps of disposing in the female half-mould an amount of at least one plastics material in the particulate state necessary for forming the structure, heating the female half-mould so as to soften the plastics material until it reaches a substantially semi-fluid state, applying the male half-mould which is at room temperature on the substantially semi-fluid plastics material for a short period and at low pressure so as to completely fill the cavity defined by the two half-moulds and form a shell having the shape of a portion of said cavity defined by the male half-mould by the local solidification of the plastics material which comes in contact with the inner relatively cold surface of the male half-mould, withdrawing the male half-mould and cooling the structure thus formed in the female half-mould, said shell performing the shape retaining and enclosure functions of said male half-mould during said last cooling step.

2. A process as claimed in claim 1, wherein said half-moulds have thin walls and a low thermal inertia.

3. A process as claimed in claim 1, wherein the thermoplastic material has a filler comprising reinforcing fibres of the desired length for imparting the required strength to the structure.

4. A process as claimed in claim 1, wherein the structure is formed by the superposition of at least one layer of thermoplastic material adapted to form the body of the structure and at least one layer of material adapted to form a surface covering of said structure, said layers of materials being weldable together and having compatible melting points and shrinkage properties.

5. A process as claimed in claim 4, wherein for the purpose of locally modifying the mechanical properties of the structure at least one of said layers of material has a fibre filler.

6. A process as claimed in claim 4, wherein the layer adapted to form said surface covering is of a coloring material.

7. A process as claimed in claim 1, further comprising placing an insert in the female half-mould before the softening step.

8. A process as claimed in claim 7, wherein said insert is a reinforcement.

9. A process as claimed in claim 1, wherein the softening step is carried out in a conventional gelling tunnel.

10. A process as claimed in claim 1, wherein the male half-mould is applied on the female half-mould at a pressure of substantially 10 kg./cm.$^2$ 11. A process for moulding a plurality of structures from thermoplastic material, comprising the steps of disposing in a plurality of identical female half-moulds each of which defines a part of a cavity having the shape of a corresponding part of the corresponding structure to be moulded, equal amounts of at least one plastics material in a particulate state necessary for forming the structure, heating the female half-moulds so as to soften the plastics material until it reaches a substantially semi-fluid state, applying on the substantially fluid material in a first female half-mould for a short period and at low pressure a male half-mould defining a complementary part of the cavity having the shape of the corresponding part of the structure and having been maintained up till then at room temperature so as to completely fill the cavity defined by the two half-moulds and form a shell having the shape of said complementary part of the cavity by the local solidification of the plastics material which comes in contact with relatively cold inner surface of the male half-mould, withdrawing the male half-mould, cooling the structure thus formed in the female half-mould, said shell performing the shape retaining and enclosure functions of said male half-mould during said last cooling step, while said male half-mould is applied in succession on the remaining ones of said female half-moulds.

References Cited

UNITED STATES PATENTS

| | | | |
|---|---|---|---|
| 3,689,612 | 9/1972 | Taga | 264—327 X |
| 3,002,231 | 10/1961 | Walker | 18—59 |
| 3,079,642 | 3/1963 | Needham | 18—55 |
| 3,678,147 | 7/1972 | Patchen | 264—325 |
| 2,119,278 | 5/1938 | Keller | 264—319 X |

ROBERT F. WHITE, Primary Examiner

R. R. KUCIA, Assistant Examiner

U.S. Cl. X.R.

264—294, 323